(12) United States Patent
Su et al.

(10) Patent No.: US 10,611,583 B2
(45) Date of Patent: Apr. 7, 2020

(54) STRADDLE-TYPE MULTIMODAL TRANSPORTATION INTERWORKING SYSTEM

(71) Applicant: CRRC YANGTZE CO., LTD., Wuhan (CN)

(72) Inventors: Lijie Su, Wuhan (CN); Heng Huang, Wuhan (CN); Quanhai Peng, Wuhan (CN); Yueming Hu, Wuhan (CN); Xianjun Sun, Wuhan (CN); Fan Cai, Wuhan (CN); Nan Zhang, Wuhan (CN); Li Xu, Wuhan (CN); Kun Mei, Wuhan (CN); Aiwen Liu, Wuhan (CN); Quanhu Wang, Wuhan (CN)

(73) Assignee: CRRC YANGTZE CO., LTD., Wuhan (CN)

( * ) Notice: Subject to any disclaimer, the term of this patent is extended or adjusted under 35 U.S.C. 154(b) by 0 days.

(21) Appl. No.: 16/343,800

(22) PCT Filed: Jul. 25, 2017

(86) PCT No.: PCT/CN2017/094302
§ 371 (c)(1),
(2) Date: Apr. 22, 2019

(87) PCT Pub. No.: WO2018/076833
PCT Pub. Date: May 3, 2018

(65) Prior Publication Data
US 2019/0248605 A1    Aug. 15, 2019

(30) Foreign Application Priority Data

Oct. 24, 2016  (CN) .......................... 2016 1 0932595
Oct. 24, 2016  (CN) ..................... 2016 2 1157151 U

(51) Int. Cl.
*B65G 63/00*   (2006.01)
*B65G 63/04*   (2006.01)
(Continued)

(52) U.S. Cl.
CPC ............ *B65G 63/045* (2013.01); *B61B 13/04* (2013.01); *B61D 3/20* (2013.01); *B61D 47/00* (2013.01);
(Continued)

(58) Field of Classification Search
CPC .............................. B65G 63/008; B65G 3/004
(Continued)

(56) References Cited

U.S. PATENT DOCUMENTS 5,976,492 A    11/1999  Griffiths
8,585,347 B2 * 11/2013  Lanigan, Sr. ......... B66C 19/007
                                              414/342

(Continued)

FOREIGN PATENT DOCUMENTS

CN    203529772 A    4/2014
CN    205590172 A    9/2016
(Continued)

OTHER PUBLICATIONS

Office action of CN201610932595.3.
(Continued)

*Primary Examiner* — Saul Rodriguez
*Assistant Examiner* — Willie Berry, Jr.

(57) ABSTRACT

A straddle-type multimodal transportation interworking system at least comprises: a rail system (30), a cargo vehicle (140), a transfer apparatus (32) and a processor. The cargo vehicle (140) can be movably provided on a rail beam (170) of the rail system. The transfer apparatus (32) is used for transferring a goods loading device (33) from a transportation tool to the cargo vehicle (140) and loading the same
(Continued)

onto the cargo vehicle or unloading the goods loading device (33) from the cargo vehicle (140) and conveying the same onto the transportation tool. The processor is connected to the cargo vehicle and the transfer apparatus.

10 Claims, 7 Drawing Sheets

(51) Int. Cl.
  *B61B 13/04* (2006.01)
  *B61D 3/20* (2006.01)
  *B61D 47/00* (2006.01)
(52) U.S. Cl.
  CPC ...... *B65G 63/04* (2013.01); *B65G 2201/0235* (2013.01)
(58) Field of Classification Search
  USPC .............................. 414/340, 342, 344, 561
  See application file for complete search history.

(56) References Cited

U.S. PATENT DOCUMENTS

| 8,746,153 | B2 | 6/2014 | Barry | |
|---|---|---|---|---|
| 2004/0255815 | A1* | 12/2004 | Tutzauer | ............... E01B 25/305 |
| | | | | 104/126 |
| 2005/0158158 | A1 | 7/2005 | Porta | |

FOREIGN PATENT DOCUMENTS

| CN | 106564764 A | 4/2017 |
|---|---|---|
| DE | 4332232 C1 | 2/1995 |
| DE | 29922538 A | 5/2001 |
| JP | 10101231 A | 4/1998 |
| WO | 1997007007 A1 | 2/1997 |
| WO | 1997009260 A1 | 3/1997 |

OTHER PUBLICATIONS

International search report of PCT/CN2017/094302.
Examination report No. 1 for standard patent application No. 2017348143.

* cited by examiner

STRADDLE-TYPE MULTIMODAL TRANSPORTATION INTERWORKING SYSTEM

TECHNICAL FIELD

The embodiments of the present invention relate to the technical field of cargo transportation, and in particular, to a straddle-type multimodal transportation interworking system.

BACKGROUND OF THE INVENTION

In modern logistics development, how to improve the transportation efficiency and reduce the logistics costs has become an important issue. Multimodal transportation, as a high-efficiency mode of transportation, represents the development direction of the logistics industry. In China's Medium- and Long-Term Development Plan for Logistics Industry (2014-2020), it has been stressed 18 times to greatly develop multimodal transportation, and multimodal transportation is placed at the strategic level in development of the logistics industry. In addition, the $13^{th}$ Five-Year Development Plan of China's Ministry of Transport has explicitly put forward a development goal of "seamless connection" of cargo transportation; under this Plan, multimodal transport equipment will be developed greatly, efforts should be made to build a multimodal transportation organization system in which facilities are connected efficiently, hubs transfer rapidly, information is interconnected and shared, equipment is standard and professional and services are integrally matched, and priority should be given to the development of a multimodal transportation system which takes goods loading devices and semitrailers as standard carrier units.

Goods loading device multimodal transportation, as an advanced mode of transportation, has become a significant symbol of modern international cargo transportation. So far multiple modes of transportation, such as road, railway, water transportation and civil aviation in our country have achieved a huge scale, whereas these modes of transportation develop in a scattered way and fail to be linked in harmony. Road goods loading device transportation trucks (hereinafter abbreviated as road container trucks) are the only shuttle tool for effecting goods loading device drayage between ports and railway, air logistics centers. This single mode of transportation is inefficient and causes big pressure and environmental pollution to the ground transportation. As a result, the national comprehensive multimodal transportation develops slowly, and the development of the national comprehensive transportation system is affected.

Therefore, "to accelerate the multimodal transportation facility construction, build collection and distribution channels with matched capabilities, provide modern transit facilities and establish a multimodal transportation information platform" has become important issues for our country to establish a multimodal transportation system.

SUMMARY OF THE INVENTION

Embodiments of the disclosure provide a straddle-type multimodal transportation interworking system, which achieves technical effects of multimodal transportation between ports and railways, air logistics centers.

The present application provides a straddle-type multimodal transportation interworking system, which at least comprises a rail system, a cargo vehicle, a transfer apparatus and a processor;

the cargo vehicle is movably provided on a rail beam of the rail system, wherein two ends of the cargo vehicle in a running direction thereof are provided with anti-collision devices which are disposed at two opposite ends of a train frame;

the transfer apparatus is used for transferring a goods loading device from a transportation tool to the cargo vehicle and loading the goods loading device to the cargo vehicle, or unloading the goods loading device from the cargo vehicle and conveying the goods loading device onto the transportation tool;

the processor is connected to the cargo vehicle and the transfer apparatus so as to control the transfer apparatus to transfer the goods loading device, and to control the cargo vehicle to move on the rail beam after the goods loading device is secured onto the cargo vehicle;

as the goods loading device needs to be transferred, the transfer apparatus transfers the goods loading device from the transportation tool onto the cargo vehicle and loads the goods loading device onto the cargo vehicle, and the processor controls the cargo vehicle to move on the rail beam, or the transfer apparatus unloads the goods loading device from the cargo vehicle and conveys the goods loading device onto the transportation tool.

Preferably, the interworking system further comprises an elevated pillar, on which the rail beam is provided.

Preferably, the cargo vehicle comprises a base frame, at least two travelling wheels, at least two guide wheels, a travelling-driving device, a train frame and an elastic member; the at least two travelling wheels are rotatably disposed on the base frame and can rotate on an upper surface of the rail beam; the at least two guide wheels are rotatably disposed on the base frame and come into contact with two side surfaces of a travel rail of the rail beam respectively; the travelling-driving device is fixed onto the base frame and is connected to the at least two travelling wheels for driving the at least two travelling wheels to rotate; the elastic member is fixed onto the base frame; and the train frame is disposed on the elastic member;

the rail beam comprises a seat fixed on the elevated pillar and the travel rail fixed on the seat; the at least two travelling wheels are located on an upper surface of the travel rail and is rotatable on the upper surface of the travel rail; the at least two guide wheels come into contact with the two side surfaces of the travel rail of the rail beam respectively and rotate; and the processor is connected to the travelling-driving device.

Preferably, the cargo vehicle further comprises at least two stabilizing wheels, which are rotatably provided at the base frame and come into contact with the two side surfaces of the travel rail of the rail beam respectively and rotate.

Preferably, the cargo vehicle further comprises a traction beam, one end of which is fixed to the base frame and the other end of which is fixed to the train frame.

Preferably, a length of the traction beam is larger than a distance between the base frame and the train frame.

Preferably, the cargo vehicle further comprises two safety wheels, which are rotatably disposed on the base frame and positioned at two ends of the cargo vehicle in the running direction thereof.

Preferably, the transfer apparatus at least comprises a conveyance mechanism, a grab mechanism and a lift mechanism; the grab mechanism places the goods loading device on the conveyance mechanism; the conveyance mechanism transports the goods loading device to the lift mechanism; the lift mechanism raises or lowers the goods loading device, and loads the goods loading device onto or unloads the goods loading device from the cargo vehicle; and the processor is communicatively connected to the conveyance mechanism, the grab mechanism and the lift mechanism.

Preferably, the conveyance mechanism at least comprises a first frame, a chain, a first group of rotation shafts and a power outputting device; the first group of rotation shafts is disposed on the first frame; each rotation shaft of the first group of rotation shafts is provided with a gear; the chain is fitted around the gears to drive each rotation shaft of the first group of rotation shafts to rotate; and a power output end of the power outputting device is connected to the chain.

Preferably, the transfer apparatus comprises an underframe, a lifting device, a lifting table, a lift driving device, multiple travel wheels and a travel driving device;

the lifting device is connected between the underframe and the lifting table;

the lift driving device is connected to the lifting device for driving the lifting device to raise or lower the lifting table;

the multiple travel wheels are fixed under the underframe;

the travel driving device is fixed on the underframe and connected to the travel wheels, for driving the travel wheels to rotate; and the processor is communicatively connected to the lift driving device and the travel driving device.

The present application has the following advantageous effects:

By a rail system connecting various ports with railway and air logistics centers, and a processor controlling a transfer apparatus to transfer a goods loading device and controlling a cargo vehicle to move on the rail system after the goods loading device is secured on the cargo vehicle, multimodal transportation between ports and railway, air logistics centers is achieved. In addition, by replacing road goods loading device transportation trucks with the rail system, not only the transport efficiency is increased, but also the pressure on the ground transportation is reduced and the environment is also protected.

BRIEF DESCRIPTION OF THE DRAWINGS

In order to illustrate technical solutions in the prior art or embodiments of the present invention more clearly, a brief description is made below to the drawings used in the description of the embodiments. Apparently, the drawings to be described below are merely some embodiments of the present invention.

DETAILED DESCRIPTION OF THE INVENTION

By providing a straddle-type multimodal transportation interworking system, embodiments of the present application achieve such technical effect as multimodal transportation between ports and railway, air logistics centers.

Technical solutions in the embodiments of the present application are all aimed to solve the above technical problem. A general idea is as below:

a rail system is provided to connect various ports with railways, air logistics centers, and a processor is provided to control a transfer apparatus to transfer a goods loading device and control a cargo vehicle to move on a rail beam after the goods loading device is secured onto the cargo vehicle. In this way, multimodal transportation between ports and railway, air logistics centers is achieved. In addition, by replacing road goods loading device transportation trucks with the rail system, not only the transport efficiency is increased, but also the pressure on the ground transportation is reduced and the environment is also protected.

To better understand the foregoing technical solution, detailed description will be made to the technical solution with reference to the accompanying drawings and specific embodiments.

In order to solve the technical problem in the prior art that dock congestion and field shortage are caused because more vehicles, yards and workers need to be provided for increasing the efficiency of loading and unloading operations, the present application provides a straddle-type multimodal transportation interworking system, which is illustrated below.

Figure 1:
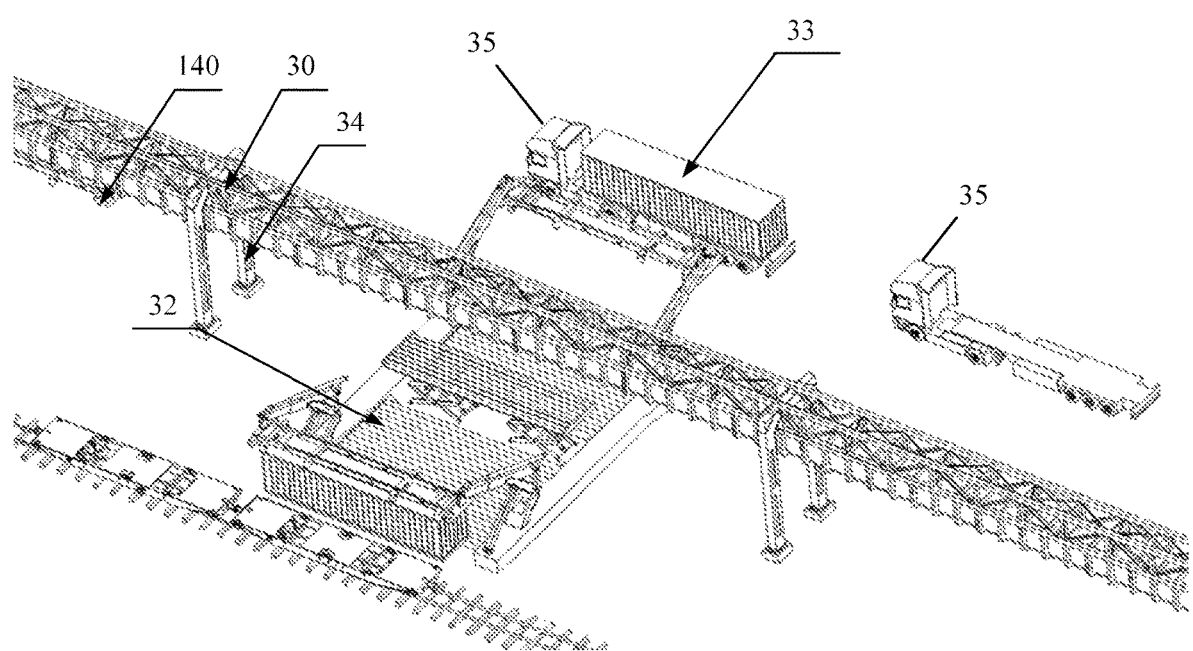
FIG. 1 shows a schematic structural view of a straddle-type multimodal transportation interworking system in accordance with some embodiments of the present application.

As shown in FIG. 1, the straddle-type multimodal transportation interworking system at least comprises: a transportation system, a transfer apparatus 32, and a processor. The transportation system comprises a rail system 30 and a cargo vehicle 140.

The cargo vehicle 140 is movably provided on rail beams 170 of the rail system 30. The transfer apparatus 32 is used for transferring a goods loading device 33 from a transportation tool 35 to the cargo vehicle 140 and loading the same onto the cargo vehicle 140, or unloading the goods loading device 33 from the cargo vehicle 140 and conveying the same onto the transportation tool 35.

The processor is connected to the cargo vehicle 140 and the transfer apparatus 32 so as to control the transfer apparatus 32 to transfer the goods loading device 33, and after the goods loading device 33 is secured on the cargo vehicle 140, to control the cargo vehicle 140 to move on the rail beams;

When the goods loading device 33 needs to be transferred, the transfer apparatus 32 transfers the goods loading device 33 from a transportation tool 35 to the cargo vehicle 140 and loads the same onto the cargo vehicle 140, and the processor controls the cargo vehicle 140 to move on the rail beams, or the transfer apparatus 32 unloads the goods loading device 33 from the cargo vehicle 140 and conveys the same onto the transportation tool 35.

Figure 2:
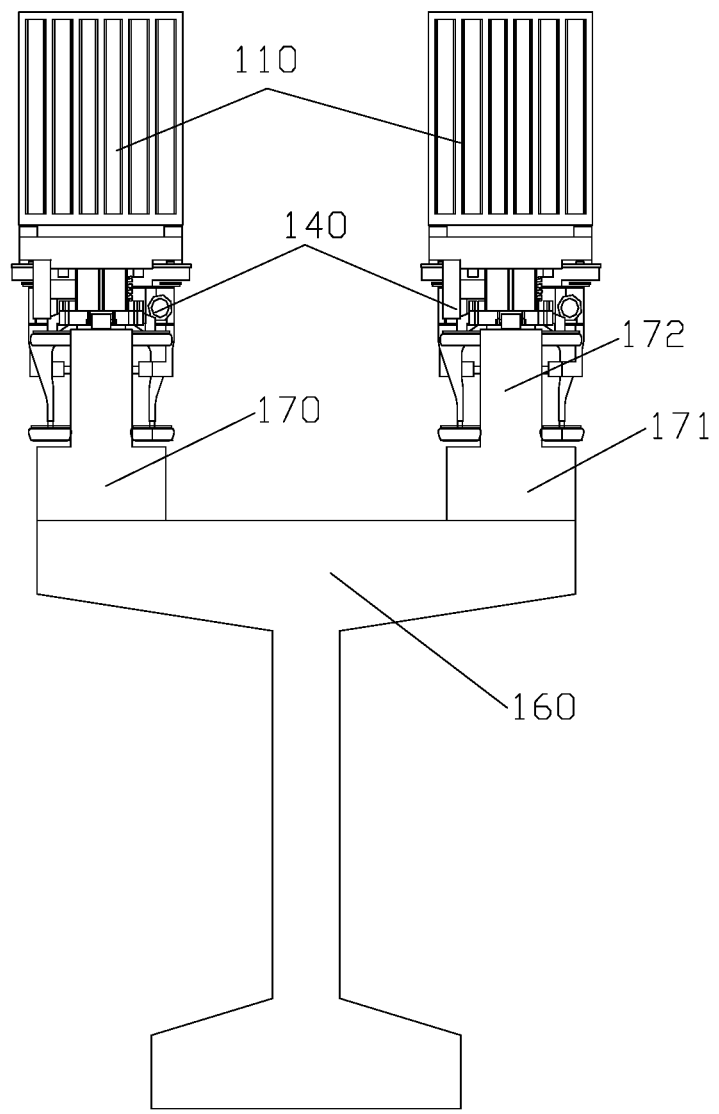
FIGS. 2 and 3 show a front view and a side view of a transportation system of the straddle-type multimodal transportation interworking system in FIG. 1 respectively.
Figure 3:
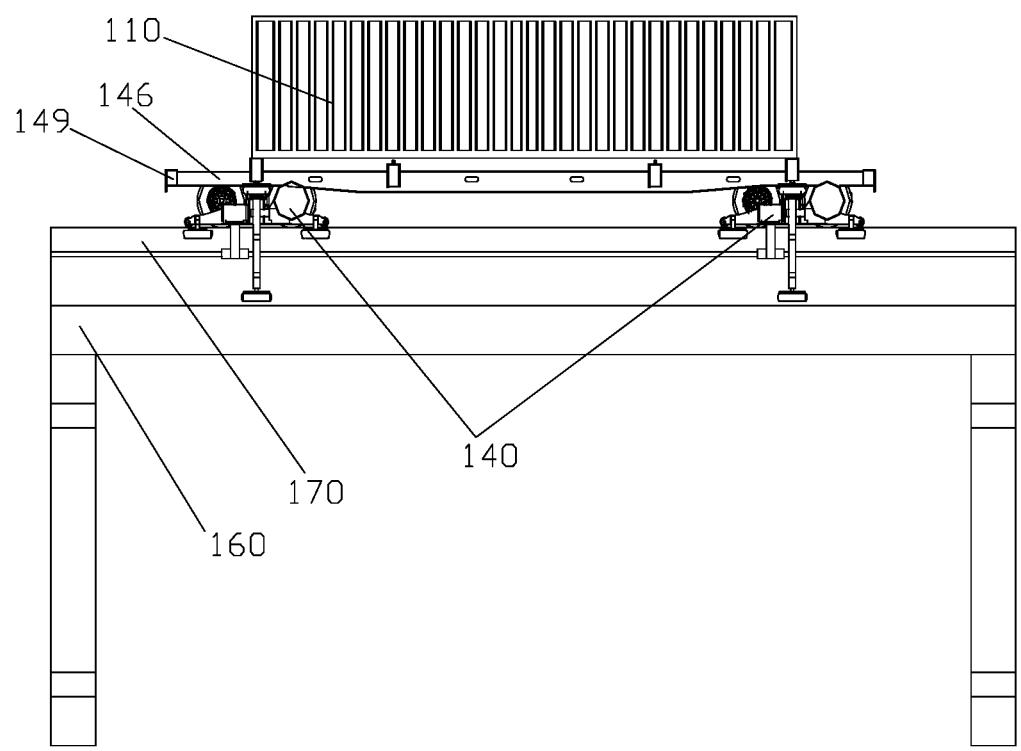

As shown in FIGS. 2 and 3, the transportation system further comprises an elevated pillar 160. There are two rail beams 170, which are provided on two opposite sides of the elevated pillar 160.

An upper surface of an upper portion of the elevated pillar 160 are bilaterally symmetrically provided with two rail grooves, which run through the elevated pillar 160 from the front end to the rear end of the elevated pillar 160. The two rail beams 170 are mounted in the two rail grooves. In the present embodiment, the elevated pillar 160 takes a "T" shape, and can be disposed in an isolation belt of a road conveniently and stably.

Figure 4:
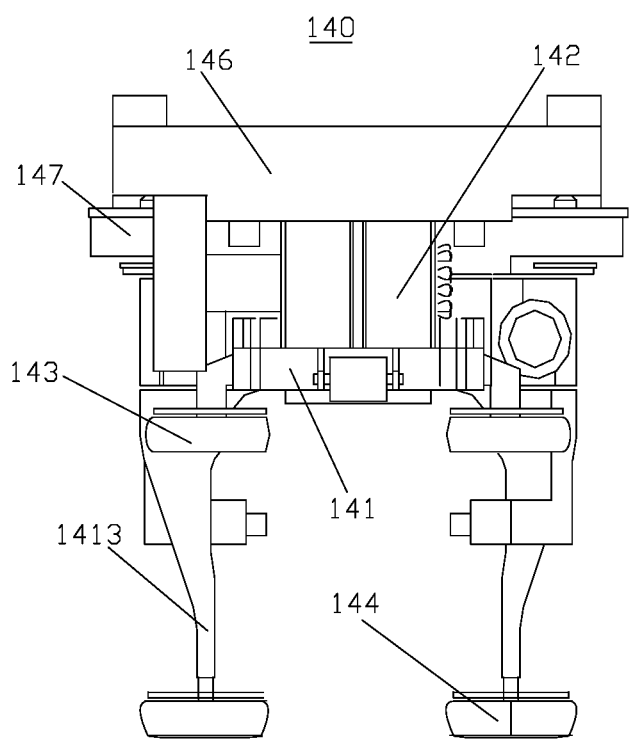
FIG. 4 shows a perspective view of a cargo vehicle of the transportation system in FIG. 2 disposed on rail beams.
Figure 5:
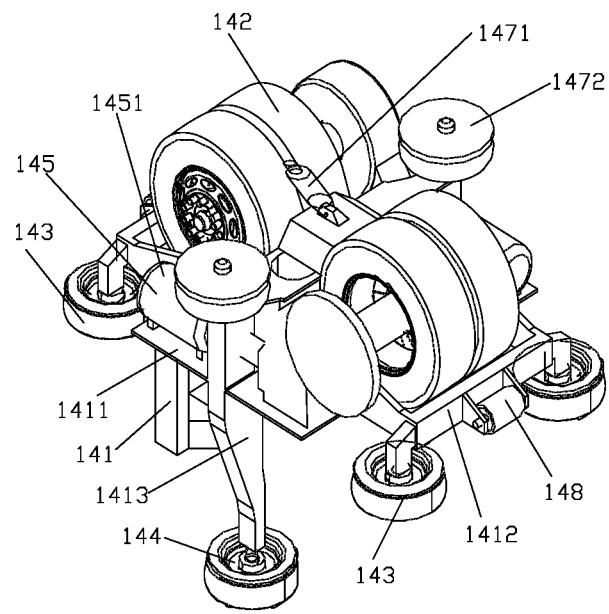
FIG. 5 shows a perspective view of the cargo vehicle in FIG. 4 without a train frame.
Figure 6:
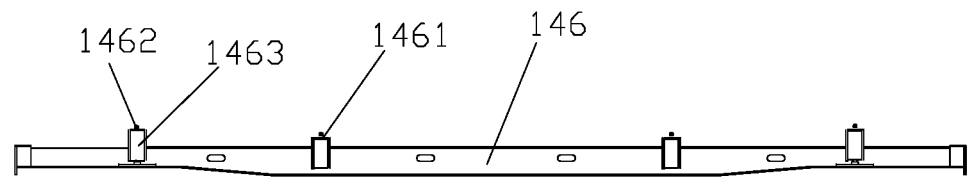
FIG. 6 shows a side view of the train frame of the cargo vehicle in FIGS. 4.

As shown in FIGS. 4 to 6, the cargo vehicle 140 comprises a base frame 141, at least two travelling wheels 142, at least two guide wheels 143, at least two stabilizing wheels 144, a travelling-driving device 145, and a train frame 146. The processor is connected to the travelling-driving device 145, controlling the travelling-driving device 145 to start or stop.

In order to increase the strength of the base frame 141, in the present embodiment, the base frame 141 adopts a welded-steel structure. The base frame 141 comprises two side frames 1411 and three cross beams 1412 arranged in parallel to one another. The three cross beams 1412 are arranged between the two side frames 1411. Each of the two side frames 1411 is provided with a fixed arm 1413. Specifically, the side frames 1411 and the cross beams 1412, as well as the side frames 1411 and the fixed arms 1413 are connected by welding in the present embodiment, or by riveting, screwing and the like in other embodiments.

The at least two travelling wheels 142 are rotatably disposed on the base frame 141 and rotatable on the rail beams. Specifically, the travelling wheels 142 are rotatable on an upper surface of travel rails of the rail beams to drive the cargo vehicle to move. In the present embodiment, there are two travelling wheels 142, which are disposed between two cross beams 1412 of the three cross beams 1412 respectively. In other embodiments, the number of the travelling wheels 142 may be three, four and the like, which may be set as required. The travelling wheel 142 has a structure consisting of an inner aluminium alloy hub for support and an outer rubber wheel outside the hub.

The at least two guide wheels 143 are rotatably disposed on the base frame 141, come into contact with two side surfaces connected to the upper surface of the travel rail of the rail beam, and can rotate on the side surfaces so as to guide and prevent the travelling wheel 142 from deflecting on the rail beam. In the present embodiment, for the sake of more stable guidance, there are four guide wheels 143, every two of which are in contact with one side surface. The four guide wheels 143 are disposed on four corners of the base frame 141 respectively. Each guide wheel 143 is of a solid rubber wheel structure with steel wheel protection.

The at least two stabilizing wheels 144 each are rotatably disposed at an end of the fixed arm 1413, come into contact with two side surfaces of the travel rail of the rail beam, and can rotate on the side surfaces so as to further prevent the travelling wheel 142 from deflecting on the rail beam and cause the travelling wheel 142 to travel more stably. The stabilizing wheel 144 adopts a solid rubber wheel structure with steel wheel protection.

The travelling-driving device 145 is fixed on the base frame 141 and connected to the at least two travelling wheels 142 for driving the at least two travelling wheels 142 to rotate. The at least two travelling wheels 142 can rotate on the upper surface of the travel rail of the rail beam to drive the cargo vehicle to move.

The travelling-driving device 145 comprises a gearbox (not shown) and an electric motor 1451. The electric motor 1451 is connected to the gearbox, and the gearbox is connected to the travelling wheel 142. The processor is connected to the electric motor 1452, so that when the electric motor 1452 is started, the processor controls the electric motor 1451 to drive the travelling wheel 142 to rotate on the travel rail of the rail beam. In the meanwhile, the at least two guide wheels 143 and the at least two stabilizing wheels 144 rotate on two side surfaces of the travel rail of the rail beam. The electric motor 1451 is powered by a way of third rail contact, and specifically, the electric motor 1451 is a traction electric motor. In the present embodiment, the electric motor 1451 is connected to the gearbox by a coupling. The travelling wheel 142 is disposed on an output shaft of the gearbox.

The cargo vehicle 140 further comprises a traction beam 1471 and an elastic member 1472. The elastic member 1472 is fixed to the base frame. Specifically, the elastic member 1472 may be an air spring, a rubber spring, etc. The train frame 146 is disposed on the elastic member 1472 which elastically supports the train frame. In order to prevent the train frame 146 from moving in a traverse direction of the elastic member 1472, the traction beam 1471 may be provided. One end of the traction beam 1471 is fixed to the base frame 141 and specifically, the middle cross beam among the three cross beams 1412, and the other end thereof is fixed to the train frame 146. Moreover, the traction beam 1471 is obliquely connected between the base frame 141 and the train frame 146, i.e. a length of the traction beam 1471 is larger than a distance between the base frame 141 and the train frame 146.

The train frame 46 is disposed on the elastic member 1472. When the cargo vehicle 140 comprises the traction beam 1471, the other end of the traction beam 1471 is fixed to the train frame 146. The train frame 146 is used for carrying a goods loading device 110. In the present embodiment, the train frame 146 is provided as a flat plate shape. A first group of locks 1461, a second group of locks 1462 and two protruding beams 1463 are provided on a surface of the train frame 146 which is opposite to the suspension device 147, i.e. a surface for carrying the goods loading device 110. Specifically, the first group of locks 1461 consists of four embosses which are snap-fastened to the bottom of the goods loading device 110 so as to prevent displacement of the goods loading device 110 relative to the train frame 146 due to vibration and diversion during transportation. The second group of locks 1462 is located external to the first group of locks 1461.

The two protruding beams 1463 are provided at two ends of the train frame 146 respectively and located external to the first group of locks 1461. The second group of locks 1462 is provided on the two protruding beams 1463, so that a height of the second group of locks 1462 is higher than that of the first group of locks 1461. In other embodiments, the two protruding beams 1463 may not be provided, but multiple bumps may be provided, so that the height of the second lock group 1462 is higher than that of the first lock group 1461.

Thereby, when the goods loading device 110 with a small size such as 20 feet is placed on the train frame 146, a bottom of the 20-foot goods loading device 110 is snap-fastened to the first group of locks 1461. Since the second group of locks 1462 is external to the first group of locks 1461, even though the height of the second group of locks 1462 is higher than that of the first group of locks 1461, the second group of locks 1462 will not interfere with the 20-foot goods loading device 110, thereby having no impact on the transportation of the goods loading device 110.

If the goods loading device 110 with a larger size such as 40 feet or 45 feet is placed on the train frame 146, since the height of the second group of locks 1462 is higher than that of the first group of locks 1461, a bottom of the 40 or 45-foot goods loading device 110 can also be snap-fastened to the second group of locks 1462 without any effect from the first group of locks 1461. Therefore, while the goods loading device 110 is prevented from displacement relative to the train frame 46, an requirement of transporting different sizes of goods loading devices 110 can be satisfied.

Further, the cargo vehicle further comprises two safety wheels 148. The two safety wheels 148 are rotatably disposed on the base frame 141 and lie on two ends of the cargo vehicle in a moving direction thereof so as to serve as protection when the travelling wheels 142 are damaged. Specifically, the safety wheels 148 may be polyurethane rollers.

Further, anti-collision devices 149 are provided on the two ends of the cargo vehicle in the moving direction thereof so as to prevent shock on the cargo vehicle and guarantee the security of the cargo vehicle and transported cargoes in case of emergency. Specifically, in the present embodiment, the anti-collision devices 149 are disposed on two opposite ends of the train frame 146.

In the present application, the cargo vehicle transports the goods loading device 110 by the train frame 146 carrying the goods loading device 110 and by the travelling wheel 142 moving on the travel rail 172 to drive the cargo vehicle 140 to run on the rail beam 170. Therefore, no more vehicles are needed to transfer the goods loading device 110. Further, the technical problem in the prior art that dock congestion and field shortage are caused because more vehicles, yards and workers need to be provided for increasing the efficiency of loading and unloading operations is solved.

In addition, the cargo vehicle of the present application has a compact overall structure and a reasonable layout and furthermore, is secure and reliable.

An electric motor power supply system of the present application is powered by a third rail contact type conductive rail, and the straddle-type single-rail goods loading device transportation vehicles run in opposite directions on rails at two sides of the elevated pillar. Therefore, air space is utilized sufficiently without any effect on ground operations inside ports. The appearance of such vehicles can effectively solve existing problems in ports, and moreover, the vehicle has a simple structure and is secure and reliable.

The rail beam 170 comprises a seat 171 fixed to the elevated pillar 160 and a travel rail 172 fixed to the seat 171. In the present embodiment, the rail beam 170 is provided as an upside down T shape.

The at least two travelling wheels 142 are provided on an upper surface of the travel rail 172 and can rotate on the upper surface of the travel rail so as to drive the cargo vehicle to move. The at least two guide wheels 143 come into contact with two side surfaces connected with the upper surface of the travel rail of the rail beam respectively and can rotate on the side surfaces. The at least two stabilizing wheels 144 come into contact with the two side surfaces of the travel rail of the rail beam respectively and can rotate on the side surfaces.

Since a rail beam 170 is provided at each side of right and left sides of an upper surface of an upper portion of the elevated pillar 160 respectively, two-way transportation can be effected. In other embodiments, when two-way transportation is not required, only one rail beam 170 may be provided, at which point the rail beam 170 may be disposed in the middle of the upper portion of the elevated pillar 160.

In the present application, the transportation system transports the goods loading device 110 by the train frame 146 carrying the goods loading device 110 and by the travelling wheel 142 moving on the travel rail 172 to drive the cargo vehicle 140 to run on the rail beam 170. Therefore, no more vehicles are needed to transfer the goods loading device 110. Further, the technical problem in the prior art that dock congestion and field shortage are caused because more vehicles, yards and workers need to be provided for increasing the efficiency of loading and unloading operations is solved.

Figure 7:
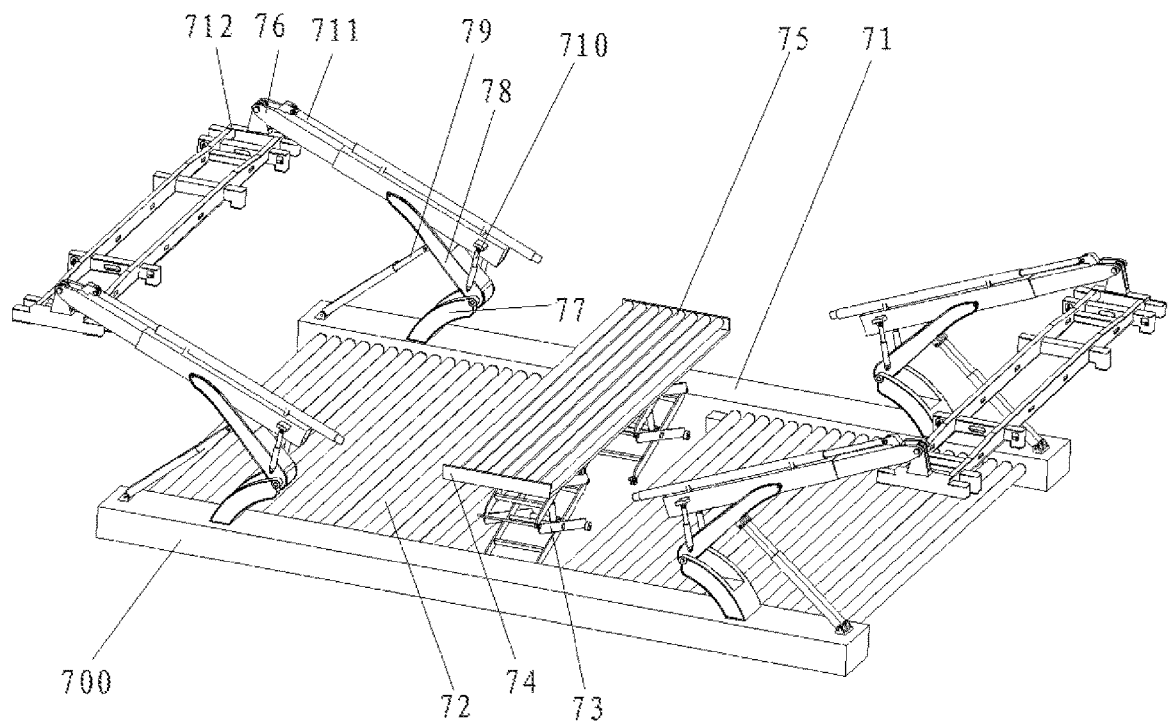
FIGS. 7 to 11 show schematic structural views of three embodiments of a transfer apparatus of the straddle-type multimodal transportation interworking system in FIG. 1.
Figure 8:
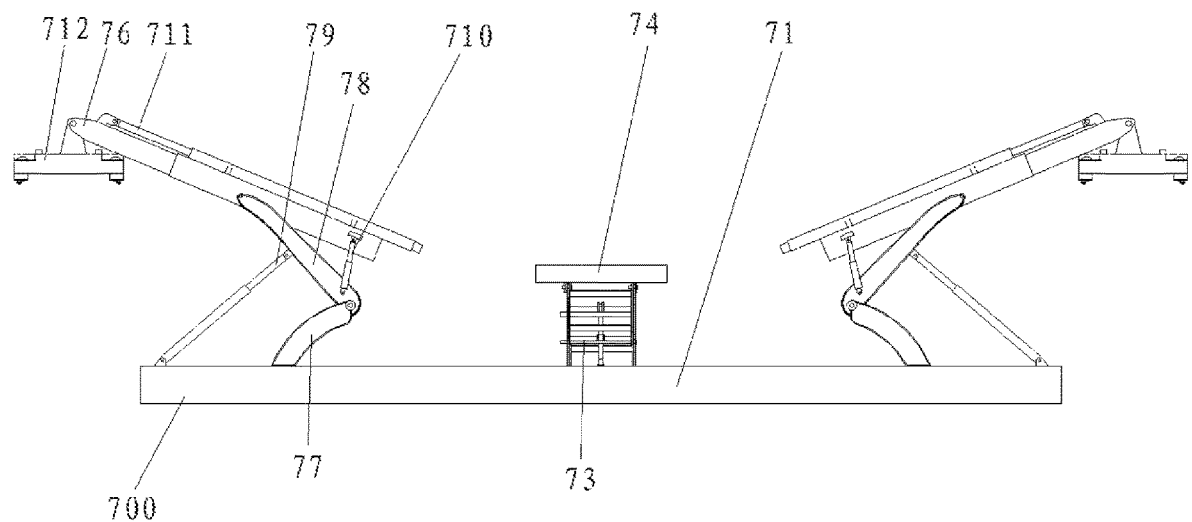

The transfer apparatus 32 may have at least three types of structure as below:

In a first type of structure, as shown in FIGS. 7 and 8, the transfer apparatus 32 has a same structure as the transfer apparatus 700. The transfer apparatus 700 at least comprises: a conveyance mechanism, a grab mechanism and a lift mechanism; the grab mechanism places the goods loading device on the conveyance mechanism; the conveyance mechanism transports the goods loading device to the lift mechanism; the lift mechanism lifts or lowers the goods loading device. The processor is communicatively connected to the conveyance mechanism, the grab mechanism and the lift mechanism.

A structure of the conveyance mechanism is illustrated. The conveyance mechanism at least comprises: a first frame 71, a chain, a first group of rotation shafts 72 and a power outputting device; the first group of rotation shafts 72 is disposed on the first frame 71; each rotation shaft of the first group of rotation shafts 72 is provided with gears; the chain is fitted around the gears to drive each rotation shaft of the first group of rotation shafts 72 to rotate; a power output end of the power outputting device is connected to the chain to drive the chain to rotate. A signal output end of the processor is communicatively connected to a signal input end of the power outputting device.

In the present embodiment, the power outputting device is an electric motor.

A structure of the lift mechanism is illustrated. The lift mechanism at least comprises: a telescopic mechanism 73 and a base; a telescopic end of the telescopic mechanism 73 is connected to the base. A signal output end of the processor is communicatively connected to a signal input end of the telescopic mechanism 73.

A structure of the base is illustrated. The base at least comprises: a second frame 74 and a second group of rotation shafts 75; a telescopic end of the telescopic mechanism 73 is connected to the second frame 74, the second group of rotation shafts 75 is disposed on the second frame 74.

The structure of the base is further illustrated. The base at least further comprises: a sensing element for sensing whether the goods loading device reaches a predefined position; the sensing element is disposed on the base. A signal output end of the sending element is connected to a signal input end of the processor.

In the present embodiment, the sensing element comprises: a displacement sensor and/or an infrared sensor or the like.

The structure of the lift mechanism is further illustrated. The lift mechanism at least further comprises: a distance measuring element for sensing an extension amount of the telescopic mechanism 73; the distance measuring element is disposed on the telescopic mechanism 73 and/or the base.

A structure of the grab mechanism is illustrated. The grab mechanism at least comprises: a telescopic arm 76, a first support rod 77, a second support rod 78, a first telescopic rod 79, a second telescopic rod 710, a third telescopic rod 711 and a spreader 712; a first end of the first support rod 77 is fixedly connected to the first frame 71, and a second end of the first support rod 77 is hinged to a first end of the second support rod 78; a second end of the second support rod 78 is hinged to the telescopic arm 76; a first end of the first telescopic rod 79 is fixedly connected to the first frame 71, and a second end of the first telescopic rod 79 is hinged to the second support rod 78; a first end of the second telescopic rod 710 is hinged to the first end of the second support rod 78, and a second end of the second telescopic rod 710 is hinged to a first end of the telescopic arm 76; a first end of the third telescopic rod 711 is fixedly connected to the first end of the telescopic arm 76, and a second end of the third telescopic rod 711 is fixedly connected to a second end of the telescopic arm 76; the second end of the telescopic arm 76 is connected to the spreader 712.

In the present embodiment, the first telescopic rod 79, the second telescopic rod 710 and the third telescopic rod 711 may be pneumatic rods or hydraulic rods, and embodiments of the present invention are not intended to limit how the telescopic rod is driven.

To achieve an automation functionality of embodiments of the present invention, at least a controller is further provided. A signal input end of the controller is communicatively connected to respective signal output ends of the sensing element and the distance measuring element, and a signal output end of the controller is communicatively connected to respective signal input ends of the telescopic mechanism 73, the power outputting device, the first telescopic rod 79, the second telescopic rod 710, the third telescopic rod 711 and the spreader 712. The controller controls the telescopic mechanism 73, the power outputting device, the first telescopic rod 79, the second telescopic rod 710, the third telescopic rod 711 and the spreader 712 to work as required.

To achieve a failure warning functionality of embodiments of the present invention, at least a warning device is further provided. A signal input end of the warning device is communicatively connected to the signal output end of the controller.

In the present embodiment, the warning device comprises a buzzer, an indicator light, etc.

According to embodiments of the present invention, before work, first it should be guaranteed that the conveyance mechanism is fixed to the ground right under the rail beam of the straddle-type multimodal transportation interworking system, and an axis of the rotation shaft in the conveyance mechanism is perpendicular to the rail, and center lines of the conveyance mechanism and the rail are on the same vertical plane. The lift mechanism is fixed to the concrete ground and disposed in the middle of the conveyance mechanism. When the lift mechanism is at an initial position, the second group of rotation shafts 75 of the lift mechanism and the first group of rotation shafts 72 of the conveyance mechanism are on the same horizontal plane.

By means of embodiments of the present invention, a procedure for transferring a goods loading device from a container truck or a railway flatcar to the straddle-type multimodal transportation interworking system is as below:

The third telescopic rod 711 extends to drive the telescopic arm 76 to stretch. In the meantime, the first telescopic rod 79 retracts, and the second telescopic rod 710 also retracts, so that the spreader 712 moves to a place right above the goods loading device. Then, the second telescopic rod 710 extends, so that the spreader 712 is lowered to a lifting position where a lock of the spreader 712 is inserted into the goods loading device. The second telescopic rod 710 stops working, and the lock of the spreader 712 works to grab and lock the goods loading device. Next, the first telescopic rod 79 extends, and the second telescopic rod 710 retracts, so that the goods loading device is detached from the container truck or railway flatcar and rises to a certain height. The third telescopic rod 711 retracts, driving the telescopic arm 76 to move towards the conveyance mechanism. Afterwards, the first telescopic rod 79 retracts, and the second telescopic rod 710 extends, so that the goods loading device is lowered onto the first group of rotation shafts 72. The spreader 712 is unlocked, the first telescopic rod 79 extends, the second telescopic rod 710 retracts, and the spreader 712 is hoisted to a certain height so that the spreader 712 is completely detached from the goods loading device placed on the first group of rotation shafts 72 and causes no interference when the goods loading device makes horizontal movement. Subsequently, the first group of rotation shafts 72 starts to rotate, driving the goods loading device to move onto the second frame 74. When the sensing element senses the goods loading device, which indicates that the goods loading device completely lies on the second frame 74. At this point, the first group of rotation shafts 72 stops working, the telescopic mechanism 73 starts to move upwards to a working position, and the cargo vehicle on the rail of the straddle-type multimodal transportation interworking system grabs and locks the goods loading device. The telescopic mechanism 73 starts to move downwards to the initial position. So far, the entire procedure that the goods loading device is transferred from the container truck or railway flatcar to the straddle-type multimodal transportation interworking system is completed. It is noteworthy that whether the telescopic mechanism 73 fails may be judged by the distance measuring element measuring an extension amount of the telescopic mechanism 73 and sending the measured extension amount to the controller. If the telescopic mechanism 73 fails, then the warning device sends a failure warning.

A procedure for transferring the goods loading device from the straddle-type multimodal transportation interworking system to the container truck or railway flatcar is reverse to the procedure described above and thus is not detailed.

Note that pairs of symmetrically distributed grab mechanisms may be provided as required, so as to improve the stability of grabbing.

Figure 9:
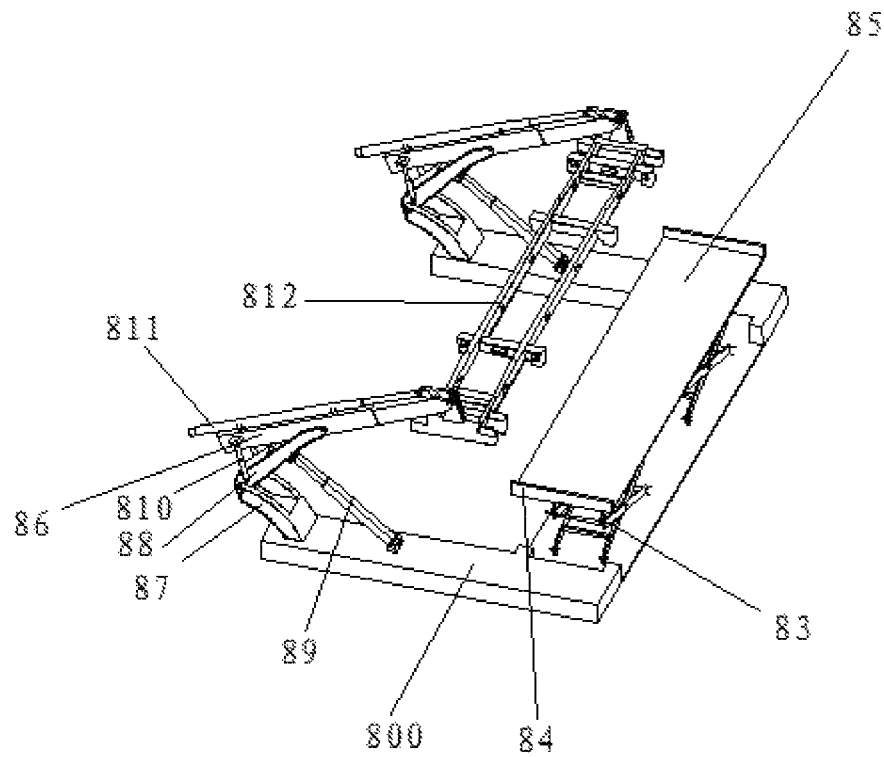

Second, as shown in FIG. 9, the transfer apparatus 32 has a same structure as the transfer apparatus 800. The transfer apparatus 800 at least comprises: a grab mechanism and a lift mechanism; the grab mechanism places the goods loading device on the conveyance mechanism; the lift mechanism lifts or lowers the goods loading device. A processor is communicatively connected to the conveyance mechanism, the grab mechanism and the lift mechanism.

A structure of the lift mechanism is illustrated. The lift mechanism at least comprises: a telescopic mechanism 83 and a base; a telescopic end of the telescopic mechanism 83 is connected to the base.

A structure of the base is illustrated. The base at least comprises: a frame 84 and a support table 85; a telescopic end of the telescopic mechanism 83 is connected to the frame 84; the support table 85 is disposed on the frame 84.

The structure of the base is further illustrated. The base further comprises at least: a sensing element for sensing whether the goods loading device reaches a predefined position; the sensing element is disposed on the base. A signal output end of the sensing element is connected to a signal input end of the processor.

In the present embodiment, the sensing element comprises: a displacement sensor and/or an infrared sensor or the like.

The structure of the lift mechanism is further illustrated. The lift mechanism further comprises at least: a distance measuring element for sensing an extension amount of the telescopic mechanism 83; the distance measuring element is disposed on the telescopic mechanism 83 and/or the base.

A structure of the grab mechanism is illustrated. The grab mechanism at least comprises: a telescopic arm 86, a first support rod 87, a second support rod 88, a first telescopic rod 89, a second telescopic rod 810, a third telescopic rod 811 and a spreader 812; a first end of the first support rod 87 is fixedly connected to the first frame 81, and a second end of the first support rod 87 is hinged to a first end of the second support rod 88; a second end of the second support rod 88 is hinged to the telescopic arm 86; a first end of the first telescopic rod 89 is fixedly connected to the first frame 81, and a second end of the first telescopic rod 89 is hinged to the second support rod 88; a first end of the second telescopic rod 810 is hinged to the first end of the second support rod 88, and a second end of the second telescopic rod 810 is hinged to a first end of the telescopic arm 86; a first end of the third telescopic rod 811 is fixedly connected to the first end of the telescopic arm 86, and a second end of the third telescopic rod 811 is fixedly connected to a second end of the telescopic arm 86; the second end of the telescopic arm 86 is connected to the spreader 812.

In the present embodiment, the first telescopic rod 89, the second telescopic rod 810 and the third telescopic rod 811 may be pneumatic rods or hydraulic rods, and embodiments of the present invention are not intended to limit how the telescopic rod is driven.

To achieve the automation functionality of embodiments of the present invention, at least a controller is further provided. A signal input end of the controller is communicatively connected to respective signal output ends of the sensing element and the distance measuring element, and a signal output end of the controller is communicatively connected to respective signal input ends of the telescopic mechanism 83, the first telescopic rod 89, the second telescopic rod 810, the third telescopic rod 811 and the spreader 812. The controller controls the telescopic mechanism 83, the first telescopic rod 89, the second telescopic rod 810, the third telescopic rod 811 and the spreader 812 to work as required.

To achieve the failure warning functionality of embodiments of the present invention, at least a warning device is further provided. A signal input end of the warning device is communicatively connected to a signal output end of the controller.

In the present embodiment, the warning device comprises: a buzzer, an indicator light, etc.

By means of embodiments of the present invention, a procedure for transferring a goods loading device from a container truck or a railway flatcar to the straddle-type multimodal transportation interworking system is as below:

The third telescopic rod 811 extends to drive the telescopic arm 86 to stretch. In the meantime, the first telescopic rod 89 retracts, and the second telescopic rod 810 also retracts, so that the spreader 812 moves to a place right above the goods loading device. Then, the second telescopic rod 810 extends, so that the spreader 812 is lowered to a lifting position where a lock of the spreader 812 is inserted into the goods loading device. The second telescopic rod 810 stops working, and the lock of the spreader 812 works to grab and lock the goods loading device. Next, the first telescopic rod 89 extends, and the second telescopic rod 810 retracts, so that the goods loading device is detached from the container truck or railway flatcar and rises to a certain height. The third telescopic rod 811 retracts, driving the telescopic arm 86 to move towards the lift mechanism. Afterwards, the first telescopic rod 89 retracts, and the second telescopic rod 810 extends, so that the goods loading device is lowered to the frame 84. When the sensing element senses the goods loading device, which indicates the goods loading device completely lies on the frame 84. At this point, the spreader 812 is unlocked, the telescopic mechanism 83 starts to move upwards to a working position, and the cargo vehicle on the rail beam of the straddle-type multimodal transportation interworking system grabs and locks the goods loading device. The telescopic mechanism 83 starts to move downwards to the initial position. So far, the entire procedure that the goods loading device is transferred from the container truck or railway flatcar to the straddle-type multimodal transportation interworking system is completed. It is noteworthy that whether the telescopic mechanism 83 fails may be judged by the distance measuring element measuring an extension amount of the telescopic mechanism 83 and sending the measured extension amount to the controller. If the telescopic mechanism 83 fails, the warning device sends a failure warning.

A procedure for transferring the goods loading device from the straddle-type multimodal transportation interworking system to the container truck or railway flatcar is reverse to the procedure described above and thus is not detailed.

Figure 10:
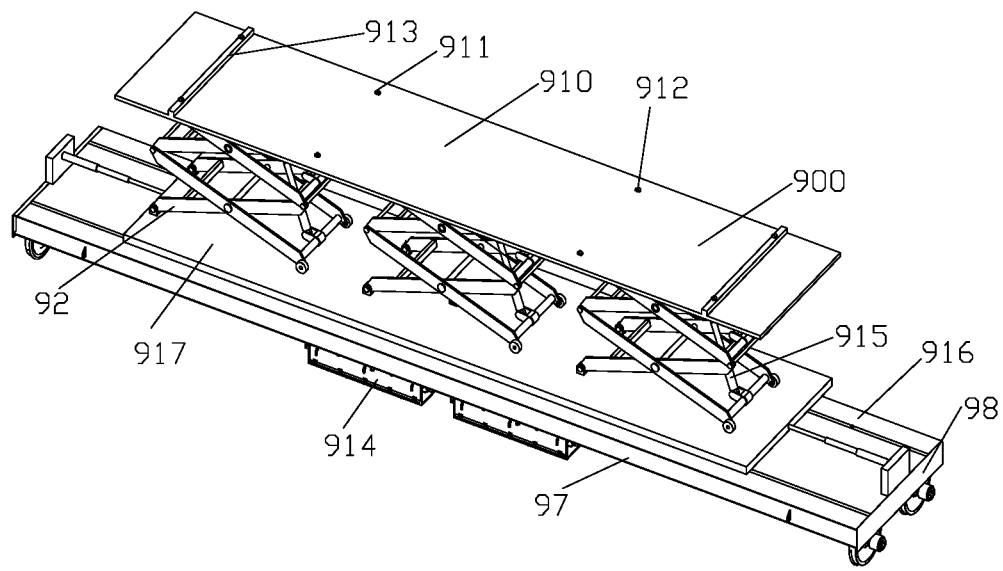
Figure 11:
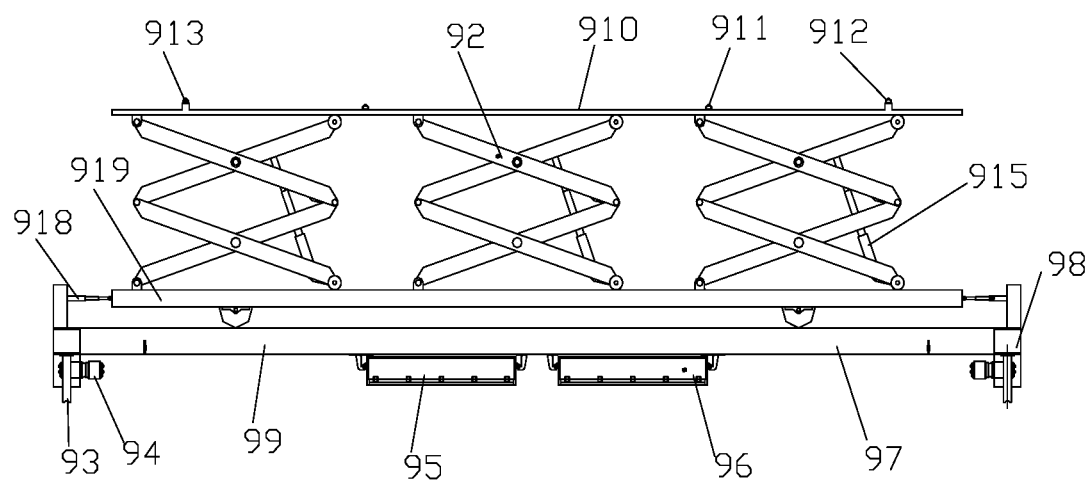

In a third type of structure, as shown in FIGS. 10 and 11, the transfer apparatus comprises: an underframe 99, a lift mechanism 92, a lifting table 910, a lift driving device 914, multiple travel wheels 93, a travel driving device 94, and a translation device 917. A processor is communicatively connected to the lift driving device 914 and the travel driving device 94.

The translation device 917 may be movably disposed on the underframe 99. Specifically, the translation device 917 comprises a translation plate 919 and a translation driving device 918. The translation plate 919 is located between the lift mechanism 92 and the underframe 99. One end of the translation driving device 918 is fixed to the translation plate 919, and the other end thereof is fixed to the underframe 99. The translation driving device 918 is used to drive the translation plate 919 to translate on the underframe 99. In the present embodiment, a movement direction of the translation plate 919 is different from that of the underframe 99. Specifically, the movement direction of the translation plate 919 is perpendicular to that of the underframe 99. The translation driving device 918 may be implemented as a hydraulic cylinder, an air cylinder, or a combination of an electric motor and rack and pinion. The processor is connected to the translation driving device.

The lift mechanism 92 is connected between the translation device 917 and the lifting table 910. By adjusting the lift mechanism 92, a distance between the translation device 917 and the lifting table 910 may be adjusted. In the present embodiment, the lift mechanism 92 is provided as an X-shape structure.

The lift driving device 914 is connected to the lift mechanism 92, and drives the lift mechanism 92 to raise or lower the lifting table 910 after the lift driving device 914 is started. The lift driving device comprises a lifting motor 95, a hydraulic station 96 connected to the lifting motor 95, a hydraulic cylinder 915 connecting the hydraulic station 96 to the lift mechanism 92.

The lifting table 910 is used to carry the goods loading device. In the present embodiment, the lifting table 910 is provided as a flat plate shape. A first group of locks 911, a second group of locks 912 and two protruding beams 913 are provided on a surface of the lifting table 910 which is opposite to the lift mechanism 92, i.e. a surface for carrying the goods loading device. Specifically, the first group of locks 911 consists of four embosses which are snap-fastened to the bottom of the goods loading device so as to prevent displacement of the goods loading device relative to the lifting table 910 due to vibration and diversion during transportation. The second group of locks 912 is external to the first group of locks 911.

The two protruding beams 913 are provided at two ends of the lifting table 910 respectively and located external to the first group of locks 911. The second group of locks 912 is provided on the two protruding beams 913, so that a height of the second group of locks 912 is higher than that of the first group of locks 911. In other embodiments, the two protruding beams 913 may not be provided, but multiple bumps may be provided, so that the height of the second group of locks 912 is higher than that of the first group of locks 911.

Thereby, when the goods loading device with a small size such as 20 feet is placed on the lifting table 910, a bottom of the 20-foot goods loading device is snap-fastened to the first group of locks 911. Since the second group of locks 912 is located external to the first group of locks 911, even though the height of the second group of locks 912 is higher than that of the first group of locks 911, the second group of locks 912 will not interfere with the 20-foot goods loading device, thereby causing no impact on the transportation of the goods loading device.

If the goods loading device with a larger size such as 40 feet or 45 feet is placed on the lifting table 910, since the height of the second group of locks 912 is higher than that of the first group of locks 911, a bottom of the 40 or 45-foot goods loading device can also be snap-fastened to the second group of locks 912 without any effect from the first group of locks 911. Therefore, while the goods loading device is prevented from displacement relative to the lifting table 910, an requirement of transporting different sizes of goods loading devices can be satisfied.

The multiple travel wheels 93 are fixed beneath the underframe 99, and drive the transfer apparatus to move when the multiple travel wheels 93 rotate. In the present embodiment, there are 4 travel wheels 93, which are disposed at two ends of the underframe 99 respectively.

The travel driving device 94 is fixed onto the underframe 99 and connected to the travel wheels 93 for driving the travel wheels to rotate. In the present embodiment, the number of the travel driving devices 94 is equal to that of the travel wheels 93, i.e. one driving device 94 drives one travel wheel 93. In other embodiments, one driving device 94 may also drive two travel wheels 93, three travel wheels 93, four travel wheels 93, etc. In the present embodiment, the driving device 94 is an electric motor which is powered by storage batteries. The storage batteries may be provided at the bottom or upper portion of the underframe 99 as required.

In the present embodiment, to increase a strength of the underframe 99, the underframe 99 is provided as an all welded steel structure. Specifically, the underframe 99 comprises: at least two end beams 98, at least two side beams 97, multiple cross beams (not shown) and a bottom plate 916. Two ends of the at least two end beams 98 are connected to two ends of the at least two side beams 97 respectively; the multiple cross beams are disposed between the at least two end beams 98, and two ends of the multiple cross beams are connected to the at least two side beams 97 respectively. The bottom plate 916 is fixed onto the at least two end beams 98, the at least two side beams 97 and the multiple cross beams. In other embodiments, the bottom plate 916 may not be provided. Further, in the present embodiment, a travelling direction of the multiple travel wheels 93 is parallel to a length direction of the end beam 98.

The travel wheel 93 may be provided as a rubber wheel or a universal wheel, the kinetic energy of the transfer apparatus may be provided by a super capacitor, and a quick charging pile may be arranged at a start position or a specified position.

A goods loading device transfer operation procedure for transporting a goods loading device 33 from a port goods loading device dock to a railway, road or air logistics center and other goods loading device logistics center according to embodiments of the present invention is as below:

(1) a grab mechanism of a transfer apparatus 32 at a shipment place receives a C0001# goods loading device 33 (it is assumed that the goods loading device 33 is numbered as C0001#) from a dockside loading and unloading crane at a port goods loading device dock, and a conveyance mechanism of the transfer apparatus 32 transports the C0001# goods loading device 33 to a loading & unloading place for goods loading devices where a cargo vehicle stops within a short distance, and then the lift mechanism of the transfer apparatus 32 lifts the C0001# goods loading device 33 to an appropriate height;

(2) the cargo vehicle 31 on the rail system 30 is controlled by a processor to run to the loading & unloading place, and a spreader 29 of the cargo vehicle 31 is utilized to grab the C0001# goods loading device 33 and automatically transport the same along the rail beam to a specified unloading place for the goods loading device in a multimodal transportation logistics center;

(3) the C0001# goods loading device 33 is received from the cargo vehicle 31 by the lift mechanism of the transfer apparatus 32 at the unloading place and transferred by the conveyance mechanism and the grab mechanism of the transfer apparatus 32 to a road container truck or a railway goods loading device transport vehicle which stops at the unloading place in advance. At this point, the procedure for transporting the C0001# goods loading device 33 from the port to the multimodal transportation logistics center according to embodiments of the present invention ends.

By means of embodiments of the present invention, a goods loading device 33 may also be transported from a railway, road or air goods loading device logistics center to a port goods loading device dock, a specific operation procedure of which is in a reverse order with respect to the foregoing operation procedure and thereby is not illustrated here.

Technical Effects

By a rail system 30 connecting various ports with railway and air logistics centers, and a processor controlling a transfer apparatus 32 to transfer a goods loading device 33 and controlling a cargo vehicle 31 to move on the rail system 30 after the goods loading device 33 is secured onto the cargo vehicle 31, a multimodal transportation between ports and railway, air logistics centers is achieved. In addition, by replacing road goods loading device transportation trucks with the rail system, not only the transport efficiency is increased, but also the pressure on the ground transportation is reduced and the environment is also protected.

By means of a sky rail system 30 according to embodiments of the present invention, interconnecting and interworking between various goods loading device distribution centers may be achieved, and harmonious connection between rail, water, road and air logistics systems is realized, completely meeting "zero-distance transfer and seamless connection" requirements, and sufficiently releasing the ground transportation capacity. Embodiments of the present invention completely conform to the national strategy on vigorous development of multimodal transportation and provide an overall solution for intelligent and efficient transfer of goods loading device multimodal transportation.

While the preferred embodiments of the present invention have been described, those skilled in the art may make other alterations and modifications to these embodiments once learning the basic creative concept. Therefore, the claims as appended are intended to be construed as including the preferred embodiments and all alterations and modifications which fall within the scope of the present invention.

It is obvious that those skilled in the art may make various changes and variations to the present invention without departing from the spirit and scope of the present invention. Thereby, if these changes and variations to the present invention belong to the scope of the claims of the present invention and equivalent technology, then the present invention is also intended to cover these changes and variations.

The invention claimed is:

1. A straddle-type multimodal transportation interworking system, comprising a rail system, a cargo vehicle, a transfer apparatus and a processor, wherein
the cargo vehicle is movably provided on a rail beam of the rail system, wherein two ends of the cargo vehicle in a running direction thereof are provided with anti-collision devices which are disposed at two opposite ends of a train frame;
the transfer apparatus is used for transferring a goods loading device from a transportation tool to the cargo vehicle and loading the goods loading device onto the cargo vehicle, or unloading the goods loading device from the cargo vehicle and conveying the goods loading device onto the transportation tool;
the processor is connected to the cargo vehicle and the transfer apparatus so as to control the transfer apparatus to transfer the goods loading device, and to control the cargo vehicle to move on the rail beam after the goods loading device is secured onto the cargo vehicle;
wherein, as the goods loading device needs to be transferred, the transfer apparatus transfers the goods loading device from the transportation tool to the cargo vehicle and loads the goods loading device onto the cargo vehicle, and the processor controls the cargo vehicle to move on the rail beam, or the transfer apparatus unloads the goods loading device from the cargo vehicle and conveys the goods loading device onto the transportation tool;
the cargo vehicle comprises: a base frame, at least two travelling wheels, at least two guide wheels, a travelling-driving device, the train frame and an elastic member; the at least two travelling wheels are rotatably disposed on the base frame and can rotate on an upper surface of the rail beam; the at least two guide wheels are rotatably disposed on the base frame and come into contact with two side surfaces of a travel rail of the rail beam respectively; the travelling-driving device is fixed onto the base frame and is connected to the at least two travelling wheels for driving the at least two travelling wheels to rotate; the elastic member is fixed onto the base frame; and the train frame is disposed on the elastic member.

2. The interworking system of claim 1, further comprising an elevated pillar, on which the rail beam is provided.

3. The interworking system of claim 2, wherein
the rail beam comprises a seat fixed on the elevated pillar and the travel rail fixed on the seat; the at least two travelling wheels are located on an upper surface of the travel rail and is rotatable on the upper surface of the travel rail; the at least two guide wheels come into contact with the two side surfaces of the travel rail of the rail beam respectively and rotate; and the processor is connected to the travelling-driving device.

4. The interworking system of claim 3, wherein the cargo vehicle further comprises at least two stabilizing wheels, which are rotatably provided at the base frame and come into contact with the two side surfaces of the travel rail of the rail beam respectively and rotate.

5. The interworking system of claim 3, wherein the cargo vehicle further comprises a traction beam, one end of which is fixed to the base frame and the other end of which is fixed to the train frame.

6. The interworking system of claim 5, wherein a length of the traction beam is larger than a distance between the base frame and the train frame.

7. The interworking system of claim 3, wherein the cargo vehicle further comprises two safety wheels, which are rotatably disposed on the base frame and positioned at two ends of the cargo vehicle in the running direction thereof.

8. The interworking system of claim 1, wherein the transfer apparatus at least comprises: a conveyance mechanism, a grab mechanism and a lift mechanism; the grab mechanism places the goods loading device on the conveyance mechanism; the conveyance mechanism transports the goods loading device to the lift mechanism; the lift mechanism raises or lowers the goods loading device, and loads the goods loading device onto or unloads the goods loading device from the cargo vehicle; and the processor is communicatively connected to the conveyance mechanism, the grab mechanism and the lift mechanism.

9. The interworking system of claim 8, wherein the conveyance mechanism at least comprises: a first frame, a chain, a first group of rotation shafts and a power outputting device; the first group of rotation shafts is disposed on the first frame; each rotation shaft of the first group of rotation shafts is provided with a gear; the chain is fitted around the gears to drive each rotation shaft of the first group of rotation shafts to rotate; and a power output end of the power outputting device is connected to the chain.

10. The interworking system of claim 1, wherein the transfer apparatus comprises: an underframe, a lifting device, a lifting table, a lift driving device, multiple travel wheels, and a travel driving device; and wherein
the lifting device is connected between the underframe and the lifting table;
the lift driving device is connected to the lifting device for driving the lifting device to raise or lower the lifting table;
the multiple travel wheels are fixed under the underframe;
the travel driving device is fixed on the underframe and connected to the travel wheels, for driving the travel wheels to rotate; and
the processor is communicatively connected to the lift driving device and the travel driving device.

* * * * *